Feb. 6, 1934.  R. J. NORTON  1,946,103
BRAKE DRUM
Filed Nov. 20, 1930
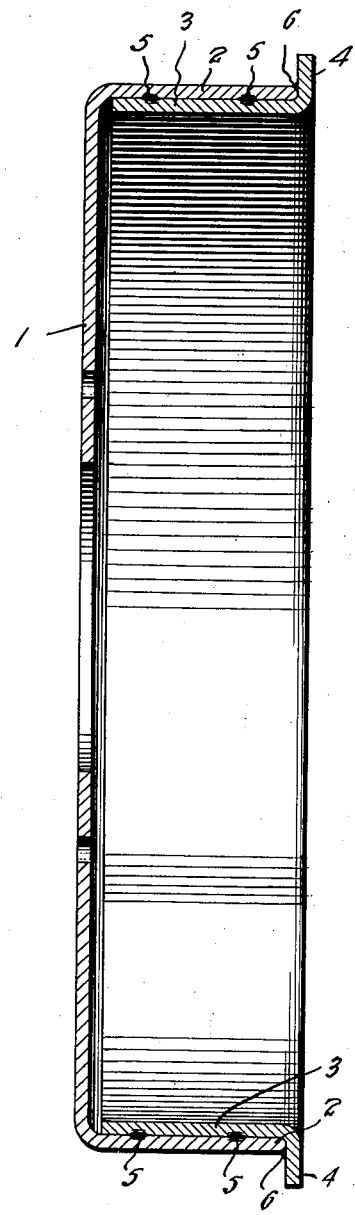
Inventor
RAYMOND J. NORTON
By Semmes & Semmes
Attorneys Patented Feb. 6, 1934

1,946,103

UNITED STATES PATENT OFFICE 1,946,103

BRAKE DRUM

Raymond J. Norton, Washington, D. C., assignor to Bendix Brake Company, South Bend, Ind., a corporation of Illinois Application November 20, 1930
Serial No. 496,989

5 Claims. (Cl. 188—218)

This invention relates to improvements in brake drums and particularly those employed on automotive vehicles.

Brake drums now generally employed in the automotive industry comprise a pressed low carbon steel member. Low carbon steel is employed because of the ease of manufacture which this metal presents. By reason of the relative softness of the metal it can be deformed into the desired shape by a simple pressing operation.

However, low carbon steel as such is not particularly desirable for brake drums due to its softness. A desideratum in brake drum structure is a relatively high degree of hardness in that portion of the drum which contacts with the non-rotating friction member. This disadvantage of the low carbon steel drum can be overcome, and such suggestion has previously been made, by providing a contacting surface of a harder material such as high carbon steel. These proposals may be considered as including two groups. In the first group a relatively thick blank of low carbon steel and a relatively thin blank of high carbon steel are simultaneously pressed into the desired shape. The resulting structure is in effect two nested brake drums, one of high carbon and one of low carbon steel. It has been proposed to make these structures integral by suitably securing the two nested drums together.

Another proposal has been to provide the drum with a separate hardened steel liner locked to the low carbon drum by dove-tail connection.

A disadvantage of the first type of drum is that excessive material is required to obtain an improved physical characteristic on one end section of the drum. The disadvantage of the second is that the structure does not provide the desired tight attachment.

An object of the present invention is to provide an improved brake drum made largely of low carbon steel but provided with a frictional engaging surface characterized by a higher degree of hardness than the remainder of the drum.

Another object is to provide a brake drum, formed largely of low carbon steel, but having a frictional engaging surface of a higher degree of hardness than that presented by low carbon steel and a rigidity greater than that provided by the low carbon steel.

Another object is to provide a composite brake drum structure having a drum section of readily deformable metal and relatively low strength but a frictional engaging surface and a rigidifying flange of harder material and higher tensile strength.

Yet another object is to utilize low carbon steel to manufacture a composite brake drum which is characterized by differential physical characteristics at different sections of the drum.

With these and other equally important objects in view the invention comprehends the provision of a pressed metal brake drum, made up from low carbon steel in the usual manner, which is provided with an integrally bonded section which presents a frictional engaging surface of a higher degree of wear resistance than the major portion of the drum and which at the same time considerably increases the rigidity of the drum and resistance to bell-mouthed expansion. In the preferred form of the invention the member which constitutes the braking flange may comprise essentially the same metal as that employed for the major brake drum casing but which is so treated as to impart the desirable improved characteristics.

In order to enable a more ready comprehension of the invention a preferred embodiment of it is shown in the single figure of the accompanying drawing.

In carrying out the invention a brake drum casing may be made up as by stamping from a blank of low carbon deep draw steel. This may be stamped out to form a member having a drum head 1 and an integral circumferential flange 2. This member, being of low carbon steel, is relatively soft and of relatively low resistance to abrasive wear. In order to increase the resistance to wear and therefore increase the longevity of the drum, and to maintain the drum substantially truly concentric, a separate member is provided. This comprises an angle shaped ring having a flat circumferential flange 3 and an integral vertical flange 4.

The liner member may be integrally joined to the brake drum proper by welding the two as at 5 and 6. The joint 5 preferably is a spot weld and the joint 6 may be either a spot weld or a butt weld.

The separate liner may comprise a high carbon steel which is initially formed up as a continuous ring or which may be made up in the form of a sheet of steel rolled to circular form and welded together at the ends. If the material chosen is a high carbon steel it will immediately be perceived that the frictional engaging surface will present a higher degree of hardness than the low carbon steel drum. Furthermore, high carbon steel possesses a higher mechanical strength than low carbon steel. By forming the member in the manner shown, that is to say with a marginal flange 4 integrally fused to the brake drum, there is imparted to the brake drum as a whole a rigidity which approximates the rigidity of a high carbon steel drum. Therefore, with this type of construction the ease of manufacture of the low carbon steel drum may be combined with the desirable physical characteristics of a high carbon steel drum.

Other advantages are secured with this construction. For example low carbon steel is characterized by a higher degree of heat expansion than the high carbon steel. With this type of construction the liner receives a greater degree of heat than the exterior low carbon steel shell. However, by the provision of a continuous integral flange 4 extending beyond the surface of the flange 2 a considerable cooling effect is obtained. The cooling of the interior flange, therefore, is achieved by transmission of its contained heat by conduction to the low carbon steel fused shell and thence by radiation to the atmosphere, and also directly by conduction to the integral flange 4.

This structure then at once provides for improved mechanical properties of the braking flange and also for improved heat transmission. By reason of this increased heat transmission from the frictional engaging surface, the differential heat expansion of the two materials is substantially neutralized, for although the high carbon steel member is heated to a higher degree, provision is made for increasing the dissipation of the generated heat.

Approximately these same physical characteristics may be imparted to the drum by making both the drum shell and the frictional engaging surface of low carbon steel. In this event the liner may be formed up in the manner described, that is either by making it of a continuous ring or by forming it of a strip rolled to circular form and welded at the ends. In order to impart the improved characteristic increased hardness and tensile strength, this low carbon steel member is cold worked. The rolling or stamping, or drawing, operations upon the liner member may be so regulated as to impart any desired degree of hardness and tensile strength to it. In the manner well known to those skilled in the art, the stresses set up by the cold working may be relieved to any desired degree by suitably annealing. Similarly, it is within the scope of the invention to increase tensile strength and hardness of this member by subjecting it to a heating operation above the critical point and then quenching and tempering. Instead of separate quenching and tempering steps, the liner member may be normalized. By governing the pass during the cold working and by properly regulating the annealing and tempering temperatures, the hardness and tensile strength of the member may be controlled within any desired range.

The liner made up in the manner described may be secured to the low carbon steel drum shell in the manner already described. The advantage of this type of structure obviously is that it permits the use of the one type of steel in the manufacture of the drum but, at the same time, provides a composite drum which is characterized by the described improved physical properties. The cold working or quenching operations upon this liner member at the one time advantageously modifies the two important characteristics sought for this member, that is to say the hardness and tensile strength. The hardness is important, as pointed out hereinbefore, because of the fact that this member constitutes the abrasive surface of the drum. The mechanical strength is important because this member likewise performs the function of rigidifying the entire drum and preventing bell-mouth expansion. Therefore, by these simple operations a composite brake drum is made up as readily as done heretofore with materials usually employed in the art, but, however, presenting a final product which has decided physical advantages.

While preferred modifications of the invention have been described, it is to be understood that these are given merely for the purpose of example as other materials and other specific forms of structure may be employed. For example, instead of employing a high or low carbon steel as a liner alloy steels may be utilized. These, as will be appreciated, may be chosen so as to impart at the one time, and with the one element, not only improved hardness to the braking flange but also increased strength and rigidity to the drum as a whole. When given the concept of a composite brake drum having a shell of readily formable metal and a braking flange and rigidifying flange of a metal of increased hardness and tensile strength, a wide range of modifications may be made up within the spirit of the invention.

I claim:

1. A brake drum of low carbon steel and having a welded frictional engaging surface of a steel of substantially the same carbon content but of a higher degree of hardness.

2. A brake drum of low carbon steel and having a welded frictional engaging surface of a steel of substantially the same carbon content but of a higher degree of hardness and tensile strength.

3. A composite brake drum comprising integrally bonded low carbon steel members, one of which has a higher degree of hardness than the other.

4. A brake drum comprising integrally bonded low carbon steel members, one of which has a higher tensile strength than the other.

5. A brake drum comprising two low carbon steel members integrally bonded together, one of which has a higher degree of hardness and greater tensile strength than the other.

RAYMOND J. NORTON.